Jan. 15, 1946.  F. HOTCHNER  2,393,045
LOW SPEED MOTOR
Original Filed April 2, 1942   2 Sheets-Sheet 1
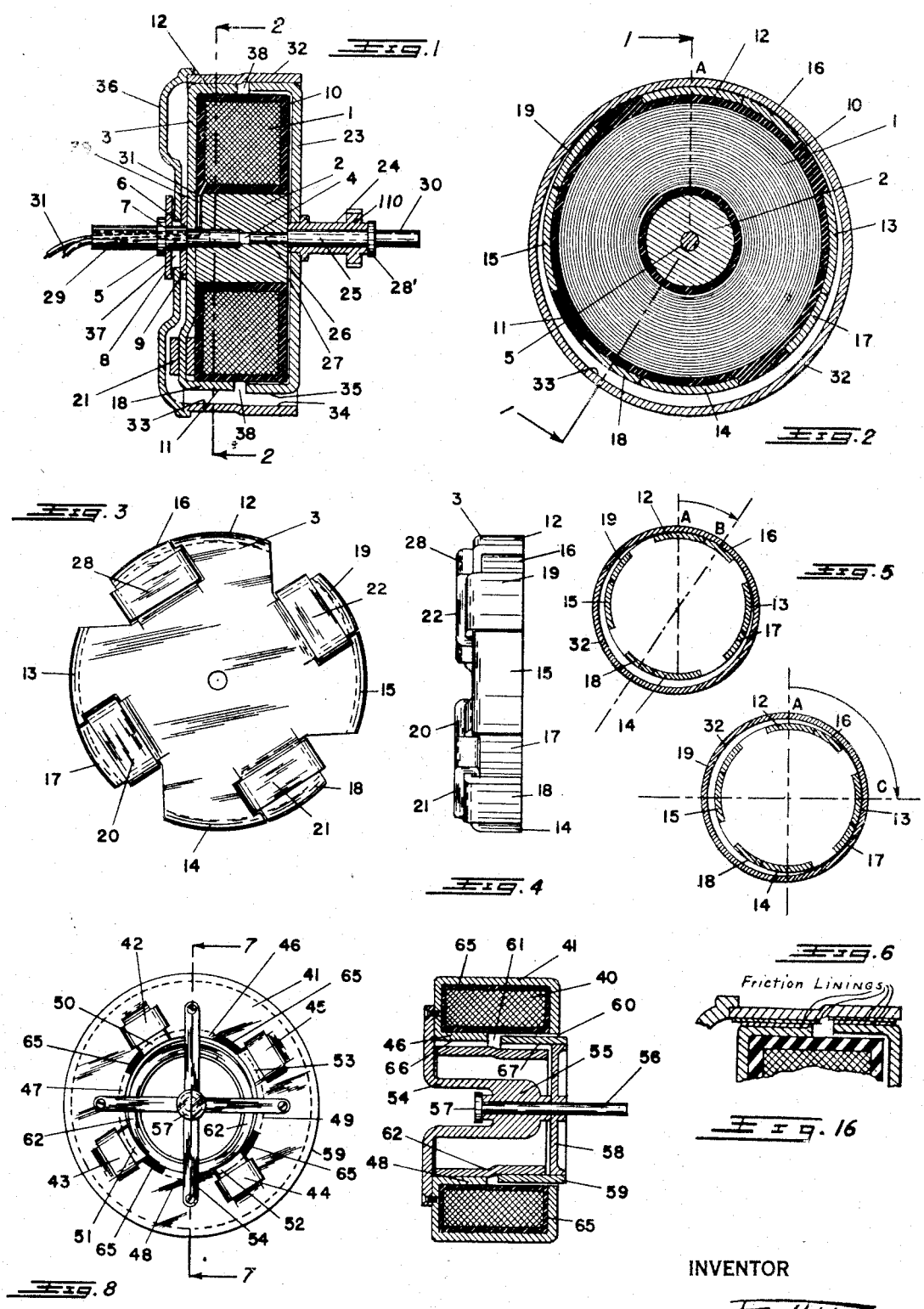
INVENTOR
Fred Hotchner Jan. 15, 1946.　　　　F. HOTCHNER　　　2,393,045
LOW SPEED MOTOR
Original Filed April 2, 1942　　2 Sheets-Sheet 2
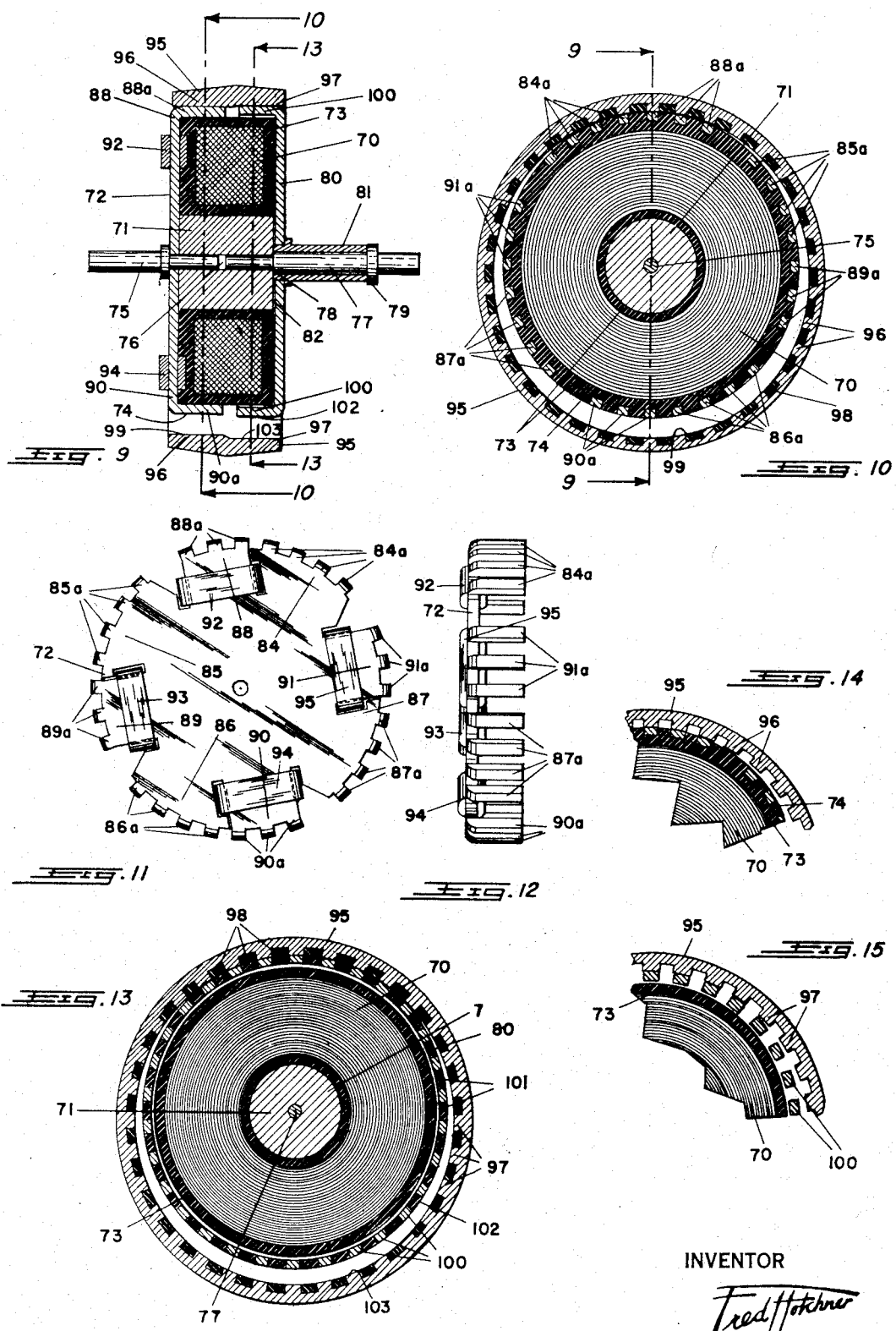
INVENTOR
Fred Hotchner Patented Jan. 15, 1946

2,393,045

UNITED STATES PATENT OFFICE 2,393,045

LOW SPEED MOTOR

Fred Hotchner, Los Angeles, Calif.

Substituted for abandoned application Serial No. 437,393, April 2, 1942. This application October 26, 1943, Serial No. 507,769

13 Claims. (Cl. 172—278)

This invention relates to a low speed motor and is directed to the production of a simple, compact and relatively powerful motor having a slow speed output shaft without the use of gear reductions.

One object hereof is to produce a motor having a field structure in which a high flux concentration is developed at the poles with a minimum of flux leakage into the region surrounding the motor.

Another object is to dispense with the typical high speed rotor of the prior art and substitute a gyrator which executes a comparatively slight eccentric gyration, driving the rotor at an angular displacement rate dependent on the difference in circumferential lengths of rollway surfaces of the two members along which they engage each other.

It is an object to reduce the moving parts to two, a gyrator ring and a rotor, and to develop as high a reduction as might be needed for the majority of all commercial uses with but a single bearing for the entire reduction. The immediately apparent advantages of these savings are; the elimination of losses of power by friction, the wear and tear on the moving parts, and other mechanical troubles attendant on the use of the toothed gear reductions of the prior art.

It is a further object to produce, in the preferred form of the invention illustrated, a monopolar motor to make for more efficient electrical design, as well as the development of high flux density in a small space, and to produce a rotating field and gap arrangement which will roll a gyrator ring around a field structure of a basic monopolar design with efficient utilization of the energy consumed in the field coil.

In this connection it is a more specific object to produce a magnetic circuit in which the whole of the magnetism developed by the field coil is effective in producing a high flux density where the traction is being exerted on the gyrator. That is, by providing for the rapid increase of the reluctance of the air gap as we move away from this region, and maintaining the spacing between the active poles at about that spacing where the pole-space traction curve shows the highest efficiency for all stages of the gyration cycle, I attain a high electrical efficiency.

A further object is to produce a magnetic speed reduction capable of extremely high reduction ratios and having various characteristics valuable in the mechanical arts.

Various other objects of the invention will be apparent from the following specification.

The invention is shown in its preferred embodiments in the accompanying drawings, it being understood that it is capable of numerous modifications within the purview of the claims.

Figure 1 is a cross section of a motor taken on the section line 1—1 in Figure 2, with the shaft and shoulders being shown in full view. In this form of the device frictional engagement under the magnetic attraction is depended on to prevent slippage between the moving parts and the poles.

Figure 2 is a cross section of the same taken on the section line 2—2 in Figure 1 showing the stator poles and the corresponding race of the gyrator.

Figure 3 is an elevation of the stator plate as it would be seen viewing the motor from the left in Figure 1. Figure 4 is a side elevation of the same as it would be seen in Figure 1, viewing the motor in elevation.

Figures 5 and 6 are diagrams taken on the same section as that of Figure 2 showing the stator poles and the gyrator in two different positions under the attraction of the rotating field.

Figure 7 is a cross section of a modified form of the invention in which the gyrator is positioned within the field coil, the shaft and shoulder being shown in full view. Figure 8 is an end elevation of the same showing the shading coils.

Figure 9 is a cross section of a further modification of the invention in which the stator, rotor and gyrator are provided with salient poles to render the motor synchronous and provide positive drive. This view is taken on the section line 9—9 in Figure 10, the shaft and shoulder being shown in full view.

Figure 10 is a cross section of the same taken on the section line 10—10 in Figure 9 showing the salient poles of the stator and the corresponding poles of the gyrator.

Figure 11 is an elevation of the stator plate as it would be seen viewing the motor from the left in Figure 9 showing the shading coils. Figure 12 is a side elevation of the same as it would be seen viewing the motor as shown in Figure 9 in elevation.

Figure 13 is a cross section of the motor taken on the section line 13—13 in Figure 9 showing the salient poles of the rotor and the corresponding poles of the gyrator.

Figure 14 is a fragmentary cross section taken on the same plane as that of Figure 10 showing a modification in which the filling between the salient poles of the gyrator is eliminated.

Figure 15 is a fragmentary cross section taken on the same plane as that of Figure 13 showing a modification in which the filling between the salient poles of both gyrator and rotor is eliminated.

Figure 16 is a fragmentary cross section of the rollway elements shown in Figure 1 showing on an enlarged scale the application of friction material coating to the contacting surfaces.

In Figure 1 and the related views I show a motor in which the energy is transmitted by frictional engagement between the moving parts under magnetic attraction. The essential parts of the motor are shown, eliminating such details as the protective casing and oiling arrangement which are common practices in the art.

The device consists of a field structure having a coaxial stator and rotor which define an annular magnetic gap encircling the rotor axis. A rotating field is set up around this gap and a gyrator encircling the gap tends to move into it under magnetic attraction. Being of larger diameter than the polar surfaces adjacent the gap, it can make contact at one sector only at a time and is rolled around the field structure by the rotating field. There is a differential in the ratios of the diameters of each rollway of the gyrator as compared to the corresponding rollway of the field structure, as a consequence of which the rotor is driven. Extremely high reduction may thus be attained. Theoretically any reduction to infinity may be had. Practically, of course, there are limitations, although there are very few commercial applications demanding reductions which cannot be had with this arrangement entirely within bounds of commercial construction.

The field structure includes the ring coil 1, the magnetic core 2, the stator end plate 3, the rotor end plate 23, the stud shafts, bearing, shading coils, etc. The core has a drilled hole 4 into which the stud shaft 5 is driven to a tight fit. On this shaft the shoulder 6 holds the stator plate in position. The shoulder at 7 retains the slip washers 8 and 9 which guide the gyrator. Porous oil-filled metal is a suitable material for these washers.

The coil, core and stator end plate are molded into a solid unit by an injection of resin 10 which positions and insulates the coil and fills the spaces between the salient poles of the stator to form a smooth rollway 11.

The stator plate is punched and formed to present four main poles 12, 13, 14 and 15 extending parallel to the rotor axis around the stator periphery, and adjacent each of these plates, one of the secondary or shaded poles 16, 17, 18 and 19. Each of these shaded poles is backset to accommodate one of the shading rings 28, 20, 21 and 22.

There is thus produced a directional bias in the flux along the gap upon the application of an alternating or pulsating current to the field coil. This becomes the equivalent of a rotating field.

The stud shaft 25, having a reduced end portion 26, is driven tight into the hole 4 oppositely to shaft 5. The shoulder 28' on this shaft retains the rotor bushing 24 with a turning fit. The bushing carries the pinion 110 or any other suitable drive means. The rotor plate 23 is tight on this bushing and so positioned lengthwise as to leave a fine gap between it and the core at 27. This clearance, of course, extends to the rotor rim. Between the rotor and core the clearance should be sufficient to allow for chance accumulations of such material as gummy residue of the lubricant, etc.

The rotor plate is cupped at the rim to form the pole piece presenting the rollway 35. In this embodiment of the invention the rotor constitutes a single magnetic pole member. The extensions 29 and 30 of shafts 5 and 25 serve as the motor mounting points. The shaft 5 is hollow as deep as necessary to make communication with the groove 39 in the core to pass the leads 31 to the coil.

The gyrator consists of the ring 32 of magnetic material having the smooth rollways 33 and 34 to run on the rollways 11 and 35 of the field structure. The guide plate 36, tight to this ring and preferably of non-magnetic material runs between the guide washers 8 and 9 to prevent twisting of the gyrator under the mechanical reaction of the rotor.

The gyrator rollways are larger in diameter than the corresponding field structure rollways so that the gyrator may make contact with the field at only one sector, the central hole 37 in the guide plate being large enough to permit the gyrator to roll around the rim of the field structure. The ratio of the diameter of each gyrator rollway to that of the corresponding field rollway is different than the diametral ratio of the other rollway pair so that a rotational moment is set up by the non-slipping traverse of the rollways over each other.

The stator and rotor members 2, 3 and 23 together form a magnetic path through and around all sides of the coil breached by the gap at 38. They are of suitable magnetic material, preferably soft iron. The gyrator also is of magnetic material, but preferably of such composition as to possess a certain retention for reasons set forth below. Obviously the electrical and magnetic effects in motors of this general class are more involved than the generally accepted theories would indicate. The explanation which follows is therefore to be understood as a generalized statement of the action for purposes of facilitating the practice of the invention, and is not to be construed as imposing any limitations on the claims.

Consider the gyrator in the position shown in Figure 2 in contact with pole 12 and the magnetism at maximum in either sign. The entire stator rim assumes the same polarity, with the condition of lag in the shaded poles as a time qualification. The flux will flow through the sector of the stator at and adjoining the line of contact to the gyrator and through the corresponding sector of the rotor an attraction exists and the parts are held in frictional engagement.

The reluctance of the double air gap, from stator to gyrator to rotor, increases very rapidly as we move away from the region of contact so that the counter attraction of pole 14 is very weak, particularly in consideration of the shunt air path across the gap at 38.

A counter pole is set up in the gyrator opposite pole 12 and will tend to persist. At a later instant in the half cycle period the attraction of shaded pole 16 will predominate over that of pole 12 and the gyrator will tend to assume the position shown in Figure 5 with the point of contact swung from A to B.

As the magnetism arises in the opposite sign the gyrator is now in position to be attracted by pole 13 at which sector the air gap is less than at pole 15 opposite. Furthermore the induced pole opposite stator pole 12 exerts a repulsion to assist the gyrator moving to the position shown in Figure 6, where the point of contact has progressed to C.

Following this sequence through the two cycles we find that the gyrator has induced in it four poles opposite the stator poles, each successive pole of opposite sign. As we repeat the cycle of gyration we find however that these poles gradually creep along the gyrator due to the different lengths of the rollways. This condition determines the degree of retention of the material to be used for the gyrator. It must not be so high as to prevent this pole migration, nor so low as to fail to develop persistent effects in the sequence described.

It is to be noted that the whole of the magnetic force developed is effective in determining the flux density at and around the contact arc, the reluctance of the alternate paths increasing rapidly as we move away from this region. The work is being done, obviously, not directly at the point of physical contact, but at some region ahead of it.

What has been said about induced poles in the gyrator at the stator end applies also at the rotor end. I prefer however, in this form of the invention to use the rotor as a return path member for the flux rather than as a pole member in the sense described above, and therefore to make it of soft iron of low retention.

In studying the magnetic action on the rotor side of the gyrator it is to be noted that for each gyrator position there is a restricted magnetic path across the gyrator from stator to rotor. There is therefore a definite tendency for induced poles to develop on the rotor end of the gyrator, and of course, to migrate with the induced poles on the other end. Likewise, if the material of the rotor has any material retention, definite induced poles will tend to develop in the rotor and to migrate.

There is obviously some latitude in the types of magnetic material permissible for these several members. As a practical matter the gyrator preferably is made of one piece and hence of one type of magnetic material on both sides. The pole migration is under definite control on the one side due to the immediate influence of the stator poles, but less definite on the other side. Still more uncertain is the pole migration around the rotor. There is thus a possibility that back tractions may exist due to the failure of the induced poles in the several elements to migrate together.

For this reason I indicate my preference to confine the specific induced pole effect to the stator side to such extent as commercial design considerations permit, and to use very soft iron for the remainder of the magnetic circuit. However, by suitable slitting of the gyrator and the rotor, according to known principles, specific control of the pole formations may be brought under a fair degree of determination.

It is to be understood, of course, that the broad question of undesirable eddy current is not treated in this specification as, according to practice well known in the art, they may be controlled by laminating, slitting or otherwise interrupting the conducting paths through the members. However, as a general practice in the commercial design of small motors they are neglected unless they produce decided disturbances in the operation.

In the motor of Figures 7 and 8 the field structure is so constructed that the gap in the flux path is within the field coil and the gyrator runs inside of instead of around the field. The field structure comprises the coil 40, the casing of magnetic material 41 which covers the outside and both ends of the coil, and the spider 54.

From the left end of the casing, as seen in Figure 7, a set of salient poles extend parallel to the rotor axis inside the coil. These poles, 46, 47, 48 and 49 are unshaded, while another set, 50, 51, 52 and 53 is formed with suitable backsets to receive the shading rings 42, 43, 44 and 45, and extend into the space within the coil to complete the rotating field combination.

A resin filling 65 seals the coil in position within the casing, insulates the coil, and completes the stator rollway 66. The spider carries the bearing 55 through which extends the rotor shaft 56. The left hand end of this shaft is shouldered at 57. At the opposite end of the bearing the shaft carries the rotor spider 58 which carries the rotor shell 59. This shell conducts the flux from the gap at 60 to the gap at 61. The inside surface of the rotor shell forms the other field structure rollway 67. The gyrator 62 rolls within this shell and the field pole combination and is guided laterally by the two spiders. The same principles of operation described above apply in general to this form of the motor as well.

In Figure 9 and the related views I show a form of the invention in which the rollways are subdivided into salient poles to render the motor synchronous and prevent slippage under normal operating conditions. By designing the magnetic circuit so as to maintain high flux concentration at the pole faces the necessity for guiding the gyrator may be eliminated, or at least so reduced that it is a minor factor in the design. I have eliminated the gyrator guide in these views.

The field coil 70 is molded into a solid unit with the core 71 and stator end plate 72 by the resin filling 73 which spaces and insulates the coil and finishes the smooth rollway 74. The stud shaft 75 has a reduced end driven tight into the drilled hole 76 in the core, holding the stator plate and providing one mounting point for the motor. Oppositely, the stud shaft 77, shouldered at 78 and 79, is driven into the core, retaining the rotor bushing 81 with a turning fit, and providing a second mounting point for the motor. The rotor plate 80 is tight to this bushing and so positioned on it that a fine gap 82 remains between the rotor and the core. The rotor is cupped as in the first described motor and clears the stator structure to run free from friction and the drag of accumulated gum, etc.

The stator is formed with four main poles 84, 85, 86 and 87, each of which is subdivided into four salient poles, similarly numbered with the suffix "a," and extending from the main pole rims parallel with the motor axis. Adjacent each of these poles is one of the shading poles 88, 89, 90 and 91, each shaded by one of the shading rings 92, 93, 94 and 95. Each shading pole is subdivided into three salient poles extending parallel to the motor axis and indicated by the similar numerals suffixed by "a."

The salient poles are spaced around the stator rim at intervals of 11°, 15' with a blank space left between each group of main and shading salient poles to provide the necessary directional bias. This spacing is the equivalent of 32 poles so far as the reduction ratio is concerned.

The gyrator consists of the ring of magnetic material 95 having a set of salient poles, 34 in number, to run over the stator, and indicated by 96. Another set of salient poles, 32 in number, and indicated by 97, run over the rotor. The spaces between these poles are filled with the resin 98 to complete the rollways 99 and 103.

The rotor is also subdivided into salient poles at its rim. These poles, indicated by 100 and filled with the resin 101 to complete the rollway 102, are 30 in number.

The filling between the poles may be eliminated if desired since, if the number of poles is high enough there is very little difference in the motion if the contact is made from tooth to tooth. Thus in Figure 14 I have shown the modification of Figure 10 which results from eliminating the resin filling of the gyrator and in Figure 15 I have shown the resin filling eliminated from the gyrator and stator. It will be seen from this, that with the number of poles chosen for this illustration, the motion will be for all practical purposes substantially the same as that with smooth rollways continuous between the poles.

The reduction produced by this device is a function of the ratio of the diameters of one set of rollways times the inverse of the ratio of the diameters of the other set. If these ratios are inverse of each other the reduction is zero regardless of the degree of eccentricity. A vast selection of combinations exists from which to work out reduction ratios, and of course, with motors of the type first described, an infinite selection, with no important limitations as to eccentricity.

The degree of eccentricity is important for several reasons. The smaller the eccentric displacement the less actual mechanical movement is executed by the gyrator with consequent mechanical simplification. However, if the air gap be reduced too much the counter attraction of poles not indicated in the action from instant to instant will enter to reduce the efficiency. In this connection it is to be noted that the air gap between the stator and rotor under the gyrator has an important function. As the gyrator moves away from the field pole faces this gap enters as an alternative shunt path for the flux. At a certain separation it presents a path of less reluctance than the double gap path through the gyrator and a quick shut off of the flux through the gyrator takes place. This distance then is directly related to the distance through which the normal tractive effort of the active poles is exerted, preferably being slightly greater.

The condition of the rollway surfaces is also a detail of some importance. An iron to iron contact under magnetic attratcion is not necessarily a desirable driving combination as one may ascertain by observing the ease with which a keeper may be slid over the face of magnet poles. The traction may be greatly improved by the application of a thin layer of friction material, preferably material having a slight resilience. Natural and synthetic rubbers are available for this service and also various convenient methods of application, notably electro plating. Rubbers having a finely divided cork content are well adapted for this work. In Figure 16 I show the rollway members of the motor of Figure 1 with coatings of friction material exaggerated in thickness for purpose of illustration.

The use of such non-slip facing may result in a slight creep or loss of synchronous drive with motors of the first type described. With motors having salient poles, the attraction of the poles is sufficient in most designs to prevent slippage and the use of such facings probably will not be indicated for the usual commercial services.

In its broad aspect my invention contemplates the production of magnetic speed reducers in which a gyrator is driven by magnetic attraction between itself and a stator in a rotating field and a rotor is similarly driven by the gyrator in a rotating field at an angular displacement rate which is dependent on the difference between the ratio of the circumferential length of the stator rollway to the length of its associated gyrator rollway and the ratio of the circumferential length of the rotor rollway to the length of its associated gyrator rollway.

The terms of the claims are to be broadly construed as embracing all substantial equivalents thereof and in particular:

The term "air gap" embraces any interruption in the magnetic circuit.

The term "alternating" embraces "pulsating" as applied to the current or magnetic flux when the result is the production of a rotating field as described.

The term "magnetic contact" as used herein means that association of the relatively moving parts in which the surfaces are closest together.

The term "rotating field" embraces all modification of a true rotating field which commonly in the art are treated as substantial equivalents thereof.

Having thus described my invention what I claim is:

1. A motor including a field structure having a stator and a rotor each with an annular rollway encircling a common axis, a gyrator ring having a pair of coaxial rollways respectively running in magnetic contact with the first said rollways and differing in diameter in the same sense therefrom, and each bearing a different diametral ratio thereto, and means to set up a rotating field between said gyrator and said field members to attract said gyrator to and roll it around said field members in substantially non-slipping association between its rollways and those of said field members whereby said rotor is turned at an angular displacement rate dependent on the difference in the ratio of the diameter of the stator rollway to its respective gyrator rollway from the ratio of the diameter of the rotor rollway to its respective gyrator rollway.

2. A motor including a field structure having a stator and a rotor each with an annular rollway encircling a common axis, a gyrator ring having a pair of coaxial rollways respectively running in magnetic contact with the first said rollways and differing in diameter in the same sense therefrom, and each having a different diametral ratio thereto, each of said rollways presenting a series of salient poles to the corresponding rollway of substantially equal lineal spacing therealong, and means to set up a rotating field between said gyrator and said field members to attract said gyrator to and roll it around said field members in substantially non-slipping association between its rollways and those of said field members whereby said rotor is turned at an angular displacement rate dependent on the difference in the ratio of the diameter of the stator rollway to its respective gyrator rollway from the ratio of the diameter of the rotor rollway to its respective gyrator rollway.

3. A motor including a field structure having a stator and a rotor each with an annular rollway encircling a common axis, a gyrator ring having a pair of coaxial rollways respectively running in magnetic contact with the first said rollways and differing in diameter in the same sense therefrom, and each bearing a different diametral ratio thereto, the rollway of said stator being divided into alternate shaded and unshaded poles spaced therearound to produce a rotating field between said gyrator and said stator and rotor upon the development of an alternating flux through said stator, and means to develop an alternating flux through said stator to attract said gyrator to and roll it around said field members in substantially non-slipping association between its rollways and those of said field members whereby said rotor is turned at an angular displacement rate dependent on the difference in the ratio of the diameter of the stator rollway to its respective gyrator rollway from the ratio of the diameter of the rotor rollway to its respective gyrator rollway.

4. A motor including a field structure having a stator and a rotor each with an annular rollway encircling a common axis, a gyrator ring having a pair of coaxial rollways respectively running in magnetic contact with the first said rollways and differing in diameter in the same sense therefrom, and each differing in diametral ratio thereto, the rollway of said stator and the corresponding rollway of said gyrator each presenting to the other a series of salient poles of substantially equal fundamental spacing therealong, the poles of one of the last said rollways being divided into alternate shaded and unshaded groups of poles arranged to produce a rotating component in the field therealong, and means to develop alternating flux between said gyrator and said field members to thereby develop a rotating field to attract said gyrator to and roll it around said field members in substantially non-slipping association between its rollways and those of said field members whereby said rotor is turned at an angular displacement rate dependent on the difference in the ratio of the diameter of the stator rollway to its respective gyrator rollway from the ratio of the diameter of the rotor rollway to its respective gyrator rollway.

5. A motor including a field structure having a stator and a rotor each with an annular rollway encircling a common axis, a gyrator ring having a pair of coaxial rollways respectively running in magnetic contact with the first said rollways and differing in diameter in the same sense therefrom, and each differing in diametral ratio thereto, the rollway of either said stator or said rotor and the corresponding rollway of said gyrator each presenting to the other a series of salient poles of substantially equal fundamental spacing therealong, the poles of one of the last said rollways being divided into alternate shaded and unshaded groups of poles arranged to produce a rotating component in the field therealong, and means to develop alternating flux between said gyrator and said field members to thereby develop a rotating field to attract said gyrator to and roll it around said field members in substantially non-slipping association between its rollways and those of said field members whereby said rotor is turned at an angular displacement rate dependent on the difference in the ratio of the diameter of the stator rollway to its respective gyrator rollway from the ratio of the diameter of the rotor rollway to its respective gyrator rollway.

6. A motor comprising a field structure including an annular coil and a stator and rotor together forming a magnetic circuit through and around said coil, said stator and said rotor each terminating along one side of an annular air gap encircling the rotor axis and presenting a rollway along said gap, a gyrator ring of magnetic material having a pair of coaxial rollway surfaces running each in contact with one of the above said rollways, each differing in diameter in the same sense therefrom, and each bearing a different diametral ratio thereto, and means to produce a rotating field in the gap between said gyrator and said field rollways upon the application of an alternating potential to said coil to roll said gyrator around said field structure and drive said rotor at an angular displacement rate dependent on the difference in the ratios of circumferential lengths above recited.

7. A motor comprising a field structure including an annular coil and a stator and rotor together forming a magnetic circuit through and around said coil, said stator and said rotor each terminating along one side of an annular air gap encircling the rotor axis and presenting a rollway along said gap, a gyrator ring of magnetic material having a pair of coaxial rollway surfaces running each in contact with one of the above said rollways, each differing in diameter in the same sense therefrom, and each bearing a different diametral ratio thereto, each of said rollways presenting a series of salient poles to the corresponding rollway of substantially equal lineal spacing therealong, and means to produce a rotating field in the gap between said gyrator and said field rollways upon the application of an alternating potential to said coil to roll said gyrator around said field structure and drive said rotor at an angular displacement rate dependent on the difference in the ratios of circumferential lengths above recited.

8. A motor comprising a field structure including an annular coil and a stator and rotor together forming a magnetic circuit through and around said coil, said stator and said rotor each terminating along one side of an annular gap encircling the rotor axis and presenting a rollway along said gap, a gyrator ring of magnetic material having a pair of coaxial rollway surfaces running each in contact with one of the above said rollways, each differing in diameter in the same sense therefrom, and each bearing a different diametral ratio thereto, the rollway of said stator being divided into alternate shaded and unshaded poles spaced therealong to produce a rotating field in the gap between said gyrator and said stator and rotor upon the application of alternating potential to said coil to roll said gyrator around said field structure and drive said rotor at an angular displacement rate dependent on the difference in the ratios of circumferential lengths above recited.

9. A motor comprising a field structure including an annular coil and a stator and rotor together forming a magnetic circuit through and around said coil, said stator and said rotor each terminating along one side of an annular gap encircling the rotor axis and presenting a rollway along said gap, a gyrator ring of magnetic material having a pair of coaxial rollway surfaces running each in contact with one of the above said rollways, each differing in diameter in the same sense therefrom, and each bearing a different diametral ratio thereto, the rollway of said stator and the corresponding rollway of said gyrator each presenting to the other a series of salient poles of substantially equal fundamental spacing therealong, the poles of one of the last said rollways being divided into alternate shaded and unshaded groups of poles arranged to produce a rotating component in the field therealong upon the application of alternating potential to said coil whereby to roll said gyrator around said field structure and drive said rotor at an angular displacement rate dependent on the difference in the ratios of circumferential lengths above recited.

10. A motor comprising a field structure including an annular coil and a stator and rotor together forming a magnetic circuit through and around said coil, said stator and said rotor each terminating along one side of an annular gap encircling the rotor axis and presenting a rollway along said gap, a gyrator ring of magnetic material having a pair of coaxial rollway surfaces running each in contact with one of the above said rollways, each differing in diameter in the same sense therefrom, and each bearing a different diametral ratio thereto, the rollways of at least one of the rollway sets thus formed each presenting to the other a series of salient poles of substantially equal fundamental spacing therealong, the poles of one of the last said rollways being divided into alternate shaded and unshaded groups of poles arranged to produce a rotating component in the field therealong upon the application of alternating potential to the said coil whereby to roll said gyrator around said field structure and drive said rotor at an angular displacement rate dependent on the difference in the ratios of circumferential lengths above recited.

11. A motor comprising a magnetic stator, and a magnetic rotor, each having an annular pole surface, a gyrator ring of magnetic material having a pair of annular coaxial pole surfaces each running in magnetic contact with one of the first said surfaces, each of said pole surfaces of said gyrator differing in circumferential length in the same sense from its associated pole surface, the ratio of the circumferential length of the stator surface to the length of its associated gyrator surface being different than the ratio of the circumferential length of the rotor surface to the length of its associated gyrator surface, and means to set up a rotating field between said gyrator and said stator and said rotor to roll said gyrator around said stator and said rotor whereby to drive said rotor at an angular displacement rate dependent on difference in the ratios of circumferential lengths above recited.

12. A motor comprising a magnetic stator and a magnetic rotor, each having an annular pole surface and a rollway therealong, a gyrator of magnetic material having a pair of annular coaxial rollways, each running in contact with one of the first said rollways, each of said gyrator rollways differing in circumferential length in the same sense from its associated contacting rollway, the ratio of the circumferential length of the stator rollway to the length of its associated gyrator rollway being different than the ratio of the circumferential length of the rotor rollway to the length of its associated gyrator rollway, and means to set up a rotating field between said stator and said rotor and said gyrator to roll said gyrator around said stator and said rotor whereby to drive said rotor at an angular displacement rate dependent on the difference in the ratios of circumferential lengths above recited.

13. A motor comprising a magnetic stator and a magnetic rotor, each having an annular pole surface along one side of an annular magnetic gap and a rollway coextensive with said gap, a gyrator ring of magnetic material having a pair of annular coaxial rollways, each running in contact with one of the first said rollways, each of said gyrator rollways differing in circumferential length in the same sense from its associated contacting rollway, the ratio of the circumferential length of the stator rollway to the length of its associated gyrator rollway being different than the ratio of the circumferential length of the rotor rollway to the length of its associated gyrator rollway, and means to set up a rotating field between said stator and said rotor in flux passing across said gap in order to attract said gyrator and roll the same around said stator and said rotor whereby to drive said rotor at an angular displacement rate dependent on the difference in the ratios of circumferential lengths above recited.

FRED HOTCHNER.